Patented June 11, 1935

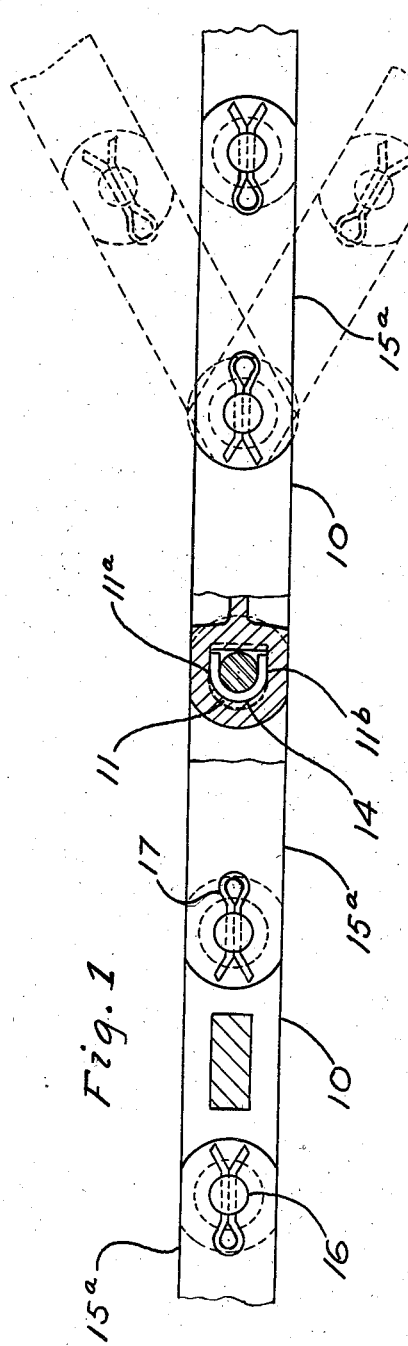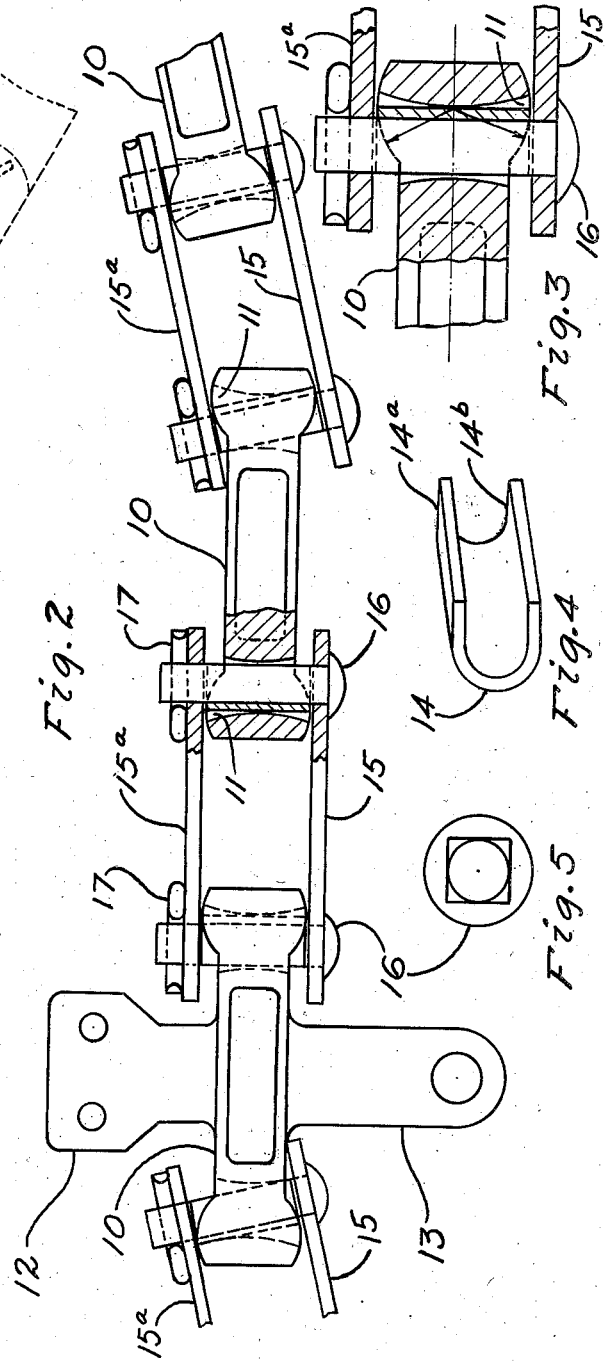

2,004,321

UNITED STATES PATENT OFFICE 2,004,321

UNIVERSAL JOINT CHAIN

Walter Hay, Sandusky, Ohio

Application September 14, 1931, Serial No. 562,698

3 Claims. (Cl. 74—245)

The invention hereinafter described relates to universal joint sprocket chains which are frequently referred to in the trade as trolley conveyor chains, the links of which are pivotally connected for universal articulation.

Chains of this type are commonly used in connection with overhead trolley systems for carrying articles and materials in any desired direction horizontally and vertically. Usually a track consisting of I-beams is suspended from the ceiling of a building, and the chain in endless form is supported at equal intervals by trolleys from the lower flange of the I-beam track. In many cases the attachments which project upwardly to connect the chain to the trolleys, also extend below the chain where they are adapted to receive a bolt, or terminate in a hook from which the articles or materials to be carried are suspended.

In view of the fact that many of these trolley conveyors are of great length there is a tendency, influenced largely by price competition, to keep the cost of the chain (generally the most costly item) down to a minimum. As a result most of these chains have been provided with small bearing areas and inadequate bearing values at the points of articulation. This has inevitably caused rapid elongation of the chain from wear and necessitated frequent adjustments to take up excessive slack in the chain.

The principal object of the present invention is to produce a universal joint chain having much greater durability than is possessed by other chains of this nature now commonly used, and at the same time one having a simple and inexpensive construction which will permit its sale on a price level with less durable chains.

Another object is to produce a chain of the character described which will permit those parts exposed to the greatest wear to be readily and inexpensively replaced with new parts. Such replacement not only adds to the length of service but practically restores the chain to its original pitch and consequent proper engagement with the sprockets.

A clear conception of one embodiment of the invention may be had by referring to the accompanying drawing, in which—

Figure 1 is a view partly in top plan and partly in section of a portion of the chain.

Fig. 2 is a view partly in side elevation and partly in section of the same.

Fig. 3 is an enlarged view in sectional side elevation of one of the universal joints.

Fig. 4 is a perspective view of one of the U-shaped bearing members, and

Fig. 5 is an end view of one of the chain pins.

Similar reference characters refer to similar parts throughout the several views of the drawing.

In the preferred construction of the chain, the inside links 10 may be cast from any suitable metal, such as malleable iron for ordinary service and alloy steel for severe service, which method of manufacture is relatively simple and inexpensive largely because it permits otherwise difficult D-shaped apertures 11 to merely be cored through the ends of the links, and partly because trolley attachment 12, material-carrying attachment 13, and the link portion 10 can all be parts of one and the same casting.

Each of the D-shaped apertures 11, with the concave wall adjacent the end of the link, is provided with parallel side walls 11a and 11b (Fig. 1) in alinement with those in the opposite end, and is adapted to receive a U-shaped bearing member 14 (Fig. 4) made from strip steel and formed with corresponding parallel side portions 14a and 14b so spaced apart that the distance between their exterior faces is slightly less than that between the parallel side walls of the aperture. The remaining walls of the aperture, or more explicitly the wall nearest the longitudinal center of the link and that adjacent the end thereof, are rounded convexly, as clearly shown in Figs. 2 and 3, to permit the U-shaped bearing member to rock or teeter in a plane parallel to the side walls 11a and 11b of the aperture.

The outside links, alternating with the inside links to form a chain of substantially uniform pitch, comprise parallel steel link-bars 15 and 15a provided near their ends with pin holes to receive pintle pins 16 which are passed through both bars at right angles thereto and also through the U-shaped bearing members housed in the ends of the inside links and interposed between the link-bars with a slight amount of end clearance.

The pintle pins 16 are known to the trade as square-shank, headed chain pins, that portion of the body next the head, and extending for a distance equal to the thickness of one of the link-bars, being square, the rest of the body being cylindrical. Accordingly one of the link-bars (15 in the drawing) is provided with square holes and the opposite link-bar is provided with round holes, the pintle or chain pins fitting tightly in both link-bars. A cotter pin 17 passed through the end of each pin opposite the head cooperates with the latter to prevent displacement of the link-bars, and permits the chain to be detachable at any joint.

From the foregoing description it will be understood that, since the U-shaped bearing members cannot rotate in the ends of the inside links, and the square-shank chain or pintle pins cannot rotate in the ends of the outside links, the live bearing in each case will be between the U-shaped bearing member and the pin, both of which are customarily case hardened to further minimize wear. In view of the fact that the bearing just described is subject to the greatest wear in the majority of installations of chains of this character, its relatively large projected bearing area and hardened bearing surfaces, together with the fact that a full live bearing is maintained at all times irrespective of the angular relation of any two adjoining links which may be considered, constitute important features of the invention by virtue of superior durability already proven in practice.

I have previously described how the U-shaped bearing members are adapted to rock or teeter in the D-shaped apertures in the ends of the inside links. Continuing the description of the knuckle joint structure, it will be seen by referring to Figs. 2 and 3 that the width of the body portion of the inside links is somewhat less than the distance between the outside link-bars, also that the knuckle boxes having rounded ends, or more specifically the inside links are provided at each end and on both sides symmetrically with swelled cylindrical portions the longitudinal axis of which is parallel to the outside link-bars and coincides with the point of bearing of the U-shaped bearing member against the crown of the rounded wall of the apertures in the inside link, as clearly indicated by the radial arrows in Fig. 3. It will be understood, of course, that suitable working clearance is provided between the cylindrical portions of the knuckle boxes and the outside link-bars or the knuckles to insure a free swiveling movement, also an easy rocking movement substantially centralized between the outside link-bars.

The chain as shown is adapted to operate around commonly used skip-tooth sprockets, that is, sprockets with every other tooth omitted. However, by providing each of the inside links with a suitable central aperture it is possible to have every link engage a sprocket tooth. By referring to Fig. 1 it will be seen that the links are pivotally connected for articulation in one plane, as when going around a sprocket or series of rollers, and Fig. 2 shows how the rockable feature of the joints permits curvature of the chain in a plane at right angles to that of Fig. 1, as when the chain-supporting trolleys follow any dips or rises in the overhead track.

While in the drawing I have shown a chain having parallel link-bars of a well-known type, it is to be understood that my invention may be used in connection with chains having various other link structures, including the well known offset-link type of chain wherein all links are alike and are provided at one end with a knuckle and pin or pintle and at the opposite end with a knuckle box provided with an aperture to receive the pin or pintle of an adjoining link. Also that cylindrical tubes with flattened sides, or square blocks with a hole through the center could be used in place of the U-shaped bearing members. Therefore it is to be understood that all matter hereinbefore set forth, or shown in the accompanying drawing, is to be interpreted as merely illustrative and not in a limiting sense.

The words "knuckle" and "knuckle box" as used throughout the specification and claims are not to be given any limited technical interpretation or meaning but are employed merely to identify the adjacent ends of adjoining links. In other words, the word "knuckle" is used to identify the link or end thereof which carries the pintle or chain pin irrespective of the construction thereof, that is, whether the link is of the "parallel bar" type or "offset-link" types, etc., and the expression "knuckle box" is used to identify the link or end thereof which is pivotally connected to the pintle or chain pin, irrespective of the construction thereof, including the size or shape of the aperture through which the pintle or chain pin extends.

I claim as my invention:

1. In a universal joint chain, the combination of a plurality of links, universal knuckle joints articulately connecting said links, said knuckle joints comprising knuckles and knuckle boxes formed on adjacent ends of adjoining links and pintle pins extending through aligned apertures in said knuckles and knuckle boxes, means for non-rotatably securing said pintle pins in said knuckles, a convex surface on the wall of said pintle apertures in said knuckle boxes adjacent the end of the link, bearing members for said pintle pins having bearing surfaces conforming to the shape of the pintle pins positioned in said pintle apertures in said knuckle boxes adapted to rock on said convex surfaces, and means for non-rotatably securing said bearing members in said pintle apertures with reference to the axis of said pintle pins.

2. In a universal joint chain, the combination of a plurality of links, universal knuckle joints articulately connecting said links, said knuckle joints comprising knuckles and knuckle boxes formed on adjacent ends of adjoining links and pintle pins extending through aligned apertures in said knuckles and knuckle boxes, means for non-rotatably securing said pintle pins in said knuckles, a convex surface on the wall of said pintle apertures in said knuckle boxes adjacent the end of the link, said knuckle boxes having rounded ends and being of greater width in the direction of the axis of the pintle aperture than the adjacent portion of the link, bearing members for said pintle pins having bearing surfaces extending longitudinally of said pintle pins and conforming to the shape thereof positioned in said pintle apertures in said knuckle boxes adapted to rock on said convex surfaces, and means for non-rotatably securing said bearing members in said pintle apertures with reference to the axis of said pintle pins.

3. In a universal joint chain, the combination of a plurality of links, universal knuckle joints articulately connecting said links, said knuckle joints comprising knuckles and knuckle boxes formed on adjacent ends of adjoining links and pintle pins extending through aligned apertures in said knuckles and knuckle boxes, means for non-rotatably securing said pintle pins in said knuckles, a convex surface on the wall of said pintle apertures in said knuckle boxes adjacent the end of the link, said knuckle boxes being of greater width in the direction of the axis of the pintle aperture than the adjacent portion of the link and having ends curved about the intersection of the longitudinal axis of the link with said convex surface, bearing members for said pintle pins positioned in said pintle apertures in said knuckle boxes adapted to rock on said convex surfaces, said bearing surfaces extending longitudinally of said pintle pins and conforming to the shape thereof, and means for non-rotatably securing said bearing members in said pintle apertures with reference to the axis of said pintle pins.

WALTER HAY.